(12) United States Patent
Nogin et al.

(10) Patent No.: US 9,026,786 B1
(45) Date of Patent: May 5, 2015

(54) SYSTEM FOR ENSURING THAT PROMISES ARE KEPT IN AN ANONYMOUS SYSTEM

(71) Applicant: HRL Laboratories, LLC, Malibu, CA (US)

(72) Inventors: Aleksey Nogin, Fresno, CA (US); Joshua Baron, Los Angeles, CA (US); Karim El Defrawy, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 105 days.

(21) Appl. No.: 13/707,598

(22) Filed: Dec. 7, 2012

(51) Int. Cl.
H04L 29/06 (2006.01)

(52) U.S. Cl.
CPC ......... H04L 63/0421 (2013.01); *H04L 63/0407* (2013.01); *H04L 2209/42* (2013.01)

(58) Field of Classification Search
CPC ............ H04L 63/0407; H04L 2209/42; H04L 63/0421; G06F 21/6245
USPC ........................................................ 713/155
See application file for complete search history.

(56) References Cited

U.S. PATENT DOCUMENTS

| | | | |
|---|---|---|---|
| 7,630,986 B1 * | 12/2009 | Herz et al. ............................ | 1/1 |
| 2002/0103999 A1 * | 8/2002 | Camnisch et al. ............ | 713/155 |
| 2003/0158960 A1 * | 8/2003 | Engberg ........................ | 709/237 |
| 2006/0258332 A1 * | 11/2006 | Jennings et al. .............. | 455/411 |
| 2012/0066497 A1 * | 3/2012 | Kumar et al. ................. | 713/168 |

OTHER PUBLICATIONS

Roger Dingledine, Nick Mathewson and Paul Syverson, "Reputation in P2P Anonymity Systems," The Free Haven Project, URL: http://freehaven.net/doc/econp2p03/econp2p03.pdf In Workshop on Economics of Peer-to-Peer Systems, May 22, 2003.
Roger Dingledine, Nick Mathewson, and Paul Syverson, "Reputation in Privacy Enhancing Technologies," http://freehaven.net/doc/cfp02/cfp02.html. in Proceeding CFP '02 Proceedings of the 12th annual conference on Computers, freedom and privacy pp. 1-6, Apr. 3, 2002, ACM New York, NY, USA © 2002, table of contents ISBN: 1-56113-505-X.
Elli Androulaki, Seung Geol Choi, Steven M. Bellovin, Tal Malkin, "Reputation Systems for Anonymous Networks," Conference: Privacy Enhancing Technologies 2008.
Repuation systems and the Internet, http://www.online-pr.com/Holding/Reputation_Systems.pdf, created Nov. 1, 2004.

(Continued)

*Primary Examiner* — Harunur Rashid
*Assistant Examiner* — Bryan Wright
(74) *Attorney, Agent, or Firm* — Tope-McKay & Associates

(57) ABSTRACT

Described is a system, method, and computer program product for ensuring that promises are kept in an anonymous system. A verifiable interaction is established between at least two users. Each user utilizes at least one pseudonym to protect their identity, which is verifiable by a third party. The pseudonyms are stored in an anonymous database controlled by the third party. The invention described herein ensures that at least one user in the verifiable interaction performs an action that is agreed upon between the users. If the user does not perform the action, then that user is prevented from establishing another verifiable interaction by the third party. In a desired aspect, the invention is utilized in an anonymous reputation system to ensure that actions that affect a user's reputation, including those that negatively impact the user's reputation, are performed as agreed upon.

15 Claims, 3 Drawing Sheets

(56) References Cited

OTHER PUBLICATIONS

Vincent Naessens1, Liesje Demuynck, and Bart De Decker, "A fair anonymous submission and review system," https://www.msec.be/vincent/pubs/fairconf.pdf, created Aug. 26, 2006.

M. Voss, et al., "A Privacy Preserving Reputation System for Mobile Information Dissemination Networks," http://ieeexplore.ieee.org/stamp/stamp.jsp?arnumber=01607569. In Proc. SECURECOMM'05, Proceedings of the First International Conference on Security and Privacy for Emerging Areas in Communications Networks, pp. 171-181, IEEE Computer Society Washington, DC, USA © 2005, table of contents ISBN:0-7695-2369-2.

Design Options for Privacy-Respecting Reputation Systems within Centralised Internet Communities, http://www.springerlink.com/content/9423773p13q287k6/, Security and Privacy in Dynamic Environments, IFIP International Federation for Information Processing, 2006, vol. 201/2006, 123-134, DOI: 10.1007/0-387-33406-8_11.

Elan Pavlov, Jeffrey S. Rosenschein, Zvi Topol, "Supporting Privacy in Decentralized Additive Reputation," http://citeseerx.ist.psu.edu/viewdoc/summary?doi=10.1.1.109.4793, Second International Conference on Trust Management, 2004.

Michael Kinateder, Ralf Terdic, and Kurt Rothermel, "Strong pseudonymous communication for peer-to-peer reputation systems," http://portal.acm.org/citation.cfm?id=1067033, Proceeding SAC '05 Proceedings of the 2005 ACM symposium on Applied computing pp. 1570-1576, ACM New York, NY, USA © 2005, table of contents ISBN:1-58113-964-0.

Michael Kinateder, Siani Pearson, "A Privacy-Enhanced Peer-to-Peer Reputation System," http://citeseerx.ist.psu.edu/viewdoc/summary?doi=10.1.1.4.5846, HPL-2004-203, HP Technical Reports, 2003.

Sandra Stainbrechar, Technische Universität Dresden, Fakuttat Informatik, D- Dresden, "Privacy-respecting Reputation System for Future Internet," May 1, 2007, Communitieshttp://citeseerx.ist.psu.edu/viewdoc/summary?doi=10.1.1.97.7174.

John Bethencourt, Elaine Shi, Dawn Song, "Signatures of reputation: Towards trust without identity," www.cs.berkeley.edu/~bethenco/sigrep-full.pdf, Jan. 19, 2011.

Omar Hasan, Lionel Brunie, Elisa Bertino "k-Shares: A Privacy Preserving Reputation Protocol for Decentralized Environments," liris.cnrs.fr/~ohasan/publications/hasan_2010_sec.pdf, May 11, 2010.

Michael Backes, Stefan Lorenz, Mattei, and Kim Pecina, "Anonymous Webs of Trust" http://www.lbs.cs.uni-saarland.de/resources/awot.pdf, Apr. 14, 2011.

J. Bethencourt, E. Shi, and D. Song, "Signatures of Reputation: Towards Trust Without Identity," in Financial Cryptography and Data Security '10. Fourteenth International Conference, 2010.

* cited by examiner

SYSTEM FOR ENSURING THAT PROMISES ARE KEPT IN AN ANONYMOUS SYSTEM

BACKGROUND OF THE INVENTION (1) Field of Invention

The present invention relates to an anonymous reputation system and, more particularly, to a cryptographically secure and anonymous reputation system for ensuring that promises are kept between users.

(2) Description of Related Art

A reputation system computes and publishes reputation scores for a set of objects (e.g., service providers, services, goods, or parties) within a community or domain, based on a collection of opinions that other parties (i.e., users) hold about the objects. Parties in a community use reputation scores for decision making (e.g., whether or not to buy a specific service or good). An object with a high reputation score will normally attract more business than an object with a low reputation score. It is, therefore, in the interest of objects to have a high reputation score.

In "Reputation Systems for Anonymous Networks" by Androulaki et al. (hereinafter referred to as the Androulaki reference), which is hereby incorporated by reference as though fully set forth herein, the authors provide security requirements for an anonymous reputation system for peer-to-peer (P2P) networks. The authors also describe the operations required in such a system and a specific instantiation of one relying on electronic cash (e-cash), blind signatures, and anonymous credentials. Briefly, e-cash is used by users to pay each other reputation coins. The accumulation of a user's reputation coins determines his/her reputation. A blind signature is a form of digital signature in which the content of a message is disguised, or blinded, prior to being signed.

The Androulaki reference describes a central "trusted" entity, the bank, which keeps track of how many reputation coins each user in the system has accumulated. After each transaction, users can deposit the reputation coins they acquired, both positive and negative, using blind signatures to preserve anonymity. Additionally, the reputation coins can be deposited at any point as well as passed on to other users who can deposit the reputation coins. Users (peers) then use pseudonyms (and anonymous credentials) to prove that they belong to a certain group and/or reputation set (i.e., their reputation is above a certain value).

The model in the Androulaki reference assumes the following. First, the model assumes that normal users can behave according to a malicious model (i.e., try to cheat, double spend, and deposit fake reputation coins). Second, the model assumes that the bank can only behave according to a honest-but-curious model, which means that it follows the protocol specification correctly, but can try to keep track of the information it receives in order to violate privacy. There are several drawbacks to the model disclosed in the Androulaki reference. First, if the bank is fully malicious (e.g., able to deviate arbitrarily from the protocol specification), the system cannot function properly, as the bank is responsible for performing reputation updates correctly. Additionally, it is not clear how the model would work with multiple banks, as the authors only describe a scenario with one group with one bank. Further, security definitions are not formalized and detailed, rigorous proofs are not provided.

There are no known references that describe anonymous protocols for depositing negative reputation coins. Moreover, the known literature does not describe constructions, either rigorous or pseudo-rigorous (e.g., "privacy" conferences), that contain negative reputation schemes for anonymous networks. Anonymous reputation schemes, in general, have not been rigorously demonstrated. There are many settings where maintaining a reputation, while preserving privacy, would be beneficial, yet there is no current solution for such an environment. Thus, a continuing need exists for a reputation system that ensures that one party does what it has agreed to do, even if it will negatively affect that party's reputation, while still maintaining anonymity.

SUMMARY OF THE INVENTION

The present invention relates to a system for ensuring that promises are kept in an anonymous system. The system comprises one or more processors and a memory having instructions such that when the instructions are executed, the one or more processors perform several operations, including establishing a verifiable interaction between at least two users, where each user has an identity, and each user utilizes at least one pseudonym to protect their identity. The verifiable interaction is verifiable by a third party. At least one pseudonym of each user is stored in an anonymous database controlled by the third party. The system presents at least one user in the verifiable interaction with a capability of performing an action that is agreed upon between the users. If the user does not perform the action, then the user is prevented from establishing another verifiable interaction by the third party.

In another aspect, the identities of at least two users are unknown to the third party.

In another aspect, the action comprises awarding at least one reputation point in a reputation system. The system further performs operations of allowing a first user to award the least one reputation point to a second user, wherein accumulation of reputation points determines a user's reputation in the reputation system. The system presents the second user with the capability of registering the at least one reputation point received by the second user from the first user. If the second user does not register the at least one reputation point, then the second user is prevented from establishing another verifiable interaction by the third party.

In another aspect, the system allows the second user to send the third party a blind permission to register at least one reputation point, wherein the third party receives only a pseudonym of the second user and a reference number linked to at least one reputation point.

In another aspect, the system provides, to the first user, data identifying all of the pseudonyms stored for the second user in the anonymous database, and allows the first user to verify with the third party whether the second user has interacted with the third party since the verifiable interaction with the first user.

In another aspect, the system allows the first user to request that the third party prevent the second party from establishing another verifiable interaction, if the first user verifies that the second user has interacted with the third party and has not registered the at least one reputation point.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a one or more computers having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
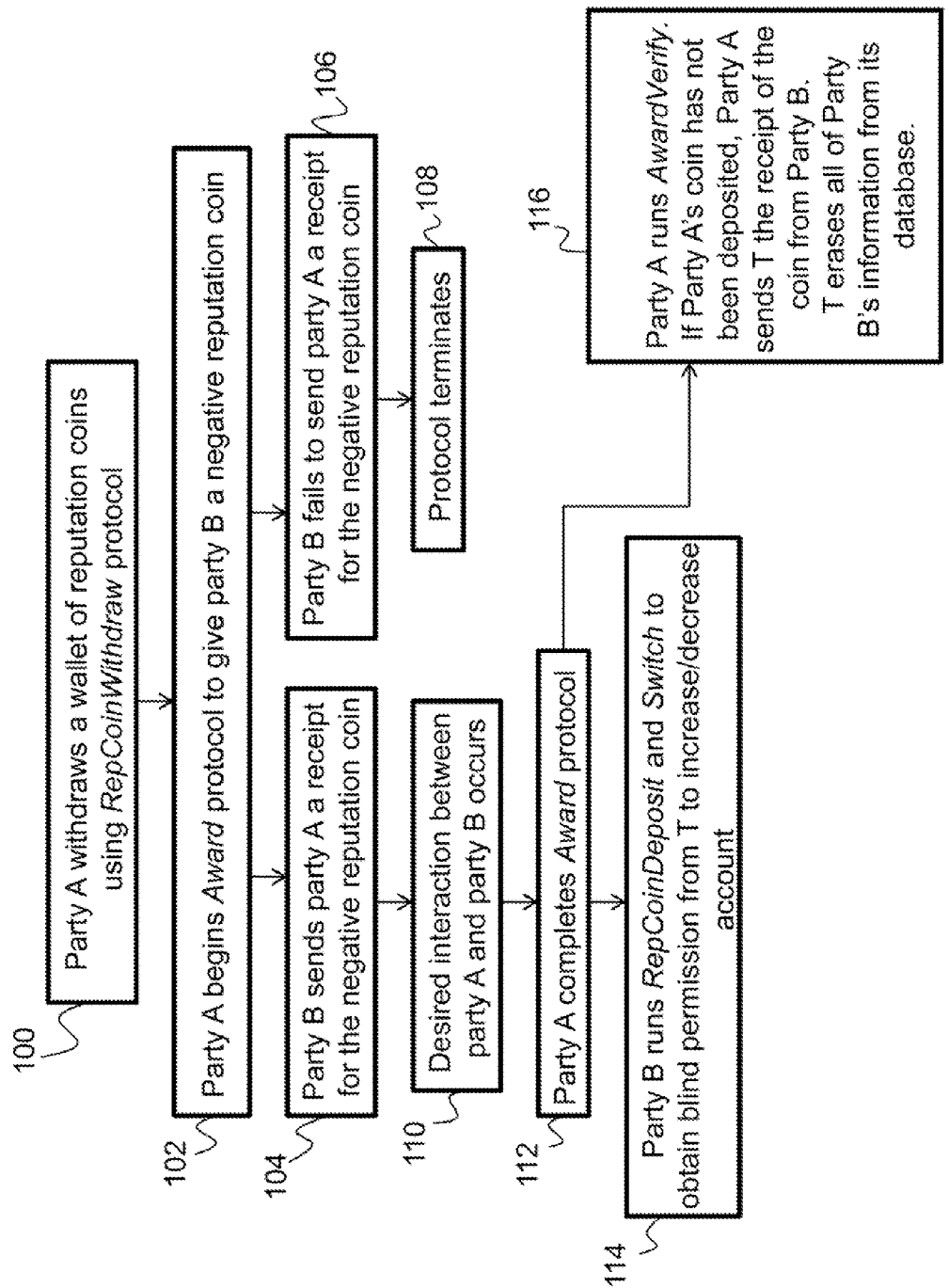
FIG. 1 is an example protocol according to the present invention.

The present invention relates to an anonymous reputation system, and more particularly, to a cryptographically secure and anonymous reputation system for ensuring that promises are kept between users. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a cryptographically secure and anonymous reputation system for ensuring that promises are kept between users. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for ensuring that promises are kept between users of a cryptographically secure and anonymous reputation system. The third principal aspect is a computer program product for ensuring that promises are kept between users of a cryptographically secure and anonymous reputation system. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

The present invention is a system, method, and computer program product for ensuring that promises are kept between users in a cryptographically secure and anonymous system. The invention described herein aims to solve a significant unsolved problem in applied cryptography, which is best illustrated through an example. Consider an anonymous reputation system instantiated using an electronic cash (e-cash) style cryptographic system. The system may be a typical e-cash system or an e-cash style system, which is not limited to a payment system. Namely, each party would like to maintain a reputation level across their pseudonyms, while at the same time relying on the honest-but-curious functionality of a "trusted" third party T who, at the same time, is trying to break the anonymity of each party (potentially working with other parties to do so).

The reputation system is designed to track the reputation, which is computed based on feedback each user receives from other users involved in common transactions. Once two parties, party A and party B, agree to transact, the normal course of action is that party A gives party B a reputation coin, also referred to as a reputation point, at the end of the transaction. The reputation coin is either positive or negative depending on party A's level of satisfaction with the transaction. Party B then anonymously "deposits" (or registers) the reputation coin with a trusted party T, resulting in party B's reputation score being updated according to party A's feedback. The e-cash or e-cash style system can either be instantiated with positive or negative coins, or two different e-cash schemes can be used: one for positive coins and one for negative coins.

In a positive case (i.e., positive feedback), if a party receives a reputation coin, there is no need to worry that the party won't deposit it with T, since it would raise their reputation and is, therefore, in their best interest. In the negative case (i.e., negative feedback), however, when party A gives party B a "negative" reputation coin meant to lower party B's reputation, party B has no interest at all in registering this coin with T. When party A and party B are anonymous (i.e., there is no way that they can identify each other after their interaction), party A generally has no way of ensuring that party B has done what party A wanted him to. Therefore, it must be ensured that party B does register the negative coin, even when party A and T both do not know party B's actual identity.

The present invention describes a cryptographically secure and anonymous protocol for party A to be assured that party B has done what he agreed to do. In particular, consider a setting where party A and party B are interacting through pseudonyms $P_A$ and $P_B$, respectively. Party A and party B also interact through T. T is only trusted to carry out the activities relating to the actions party A and party B wish to carry out, but may collude with any number of parties to try to link the various pseudonyms of each party to each other and to their originator. Such a collusion still needs to be protected. Only when T has a cryptographic proof of party B's misbehavior is T allowed to use an out-of-band method (e.g., court issues subpoena) to unmask party B's true identity.

There are several innovations behind the present invention. First, while any party can create pseudonyms, they must do so in a verifiable manner (i.e., verifiable to T) without revealing that the pseudonyms link either to each other or to their originator. Secondly, any party can search for pseudonyms that may belong to the originator of another pseudonym that they know without the searching party deriving any additional information about linkability of pseudonyms and without T gaining any additional knowledge about the originator of the pseudonyms. Third, the present invention comprises a cryptographic "on-off" switch, which is a protocol by which two parties can enter into a protocol where they employ cryptographic primitives that can only be used once and yet are completely necessary for a protocol to go through. The idea is that party A, when entering into a protocol with T, turns his switch "off" in a manner verifiable to T. Only if T desires can party A turn his switch back "on". Fourth, two parties can exchange certificates in such a way that either both receive what they want or neither do—namely, party A receives a certificate from party B that party B received a coin, and party B receives the coin.

The protocol of the present invention expands on the Androulaki reference, which has little ability to execute negative coins. The present invention ensures that negative coins are deposited with full anonymity, while the Androulaki reference is not able to compute such processes while maintaining anonymity. Accordingly, the subprotocols of the Androulaki were modified, as described below, to create greater security guarantees.

Before describing the system in detail, key elements will first be defined. Group Members are the regular users of the system. They can interact with other members of the same group, or a different group. They can award reputation points (positive and negative) to other members through their pseudonyms. They can also prove that they possess a reputation above a certain value. Group Oracles are entities which manage reputation information of members belonging to its group. The reputation information is tied to each actual identity, such as a public key, and not a pseudonym. Group Oracles participate in clearing reputations with group oracles of other groups. As in the Androulaki reference, each Group Oracle will require three data bases:

(1) Reputation coin quota database ($DB_{req}$). The $DB_{req}$ holds the amount of reputation coins (assuming an e-cash-like scheme is relied upon to award reputation points) that each Group Member can award to other peers. This database is, in fact, a database of both positive and negative coins.

(2) Reputation database ($DB_{rd}$). The $DB_{rd}$ holds the amount of reputation points that each Group Member has acquired by receiving reputation coins from other peers. Double awarding is a challenge to be mitigated by this database. Note that this database accounts for both positive and negative coins.

(3) History database ($DB_h$). The $DB_h$ holds all reputation coins that were deposited by Group Members and the associated tagged pseudonyms of those who deposited those coins.

The above database records are secured in the sense that an adversary cannot correlate deposits to individual Group Members.

The present invention works as follows. First, party A, as $P_A$, requires that party B, as $P_B$, do something that B does not want to do (e.g., register with the oracle T that party A has penalized party B with a negative reputation coin). Party A receives a token (encrypted data, such as an anonymous receipt) that will identify all other pseudonyms of party B that T has in its Anonymous Database of party B's pseudonyms, but without specifying party B or the pseudonyms. Party A can then verify with T whether party B has logged on since the last interaction with party A. If party B has logged on with T, but has not done what party A has wished (e.g., registered a certificate with T of party A's penalization of party B), then party A can request that T shut down party B from interacting ever again. T cannot link party B to a pseudonym of party B, $P_B$. Therefore, what needs to occur is that when party B, as $P_B$, logs onto T, T turns party B's switch to "off". Only when party B registers the certificate with T can party B's switch be turned back on. Until party B's switch is turned back "on", party B cannot interact with any other party and is effectively shut down. Thus, party A can verify that party B has deposited the certificate, and T can ensure that party B can relate his certificate anonymously, but cannot just receive an anonymous permission to deposit his certificate without actually depositing it.

The operations supported in the present invention are presented below. $(pk_B, sk_B) \leftarrow Bkeygen(1^k)$ is the key generation algorithm for Group Oracles. $(pk_U, sk_U) \leftarrow Ukeygen(1^k)$ is the key generation algorithm for Group Members. $pk_U$ denotes the (master) public key of U, and $sk_U$ denotes the master secret key of U as described in the Androulaki reference. $(P, si_P) \leftarrow Pnymgen(1^k)$ is the pseudonym generation algorithm for Group Members as described in the Androulaki reference. The $si_P$ is the secret data used to generate the pseudonym P.

Pnmylag is a pseudonym generation algorithm where a Group Member sends the Group Oracle all of their pseudonyms in an encrypted, oblivious form. In other words, T receives a database that it can't parse but can verify in an oblivious way (similar to oblivious database queries) to determine whether a pseudonym exists or not. $Verif_E(tag, E(D))$ shows which sets of names are the set of pseudonyms for party B without revealing what they are or, for that matter, which set exactly is the one containing all the pseudonyms.

The following are reputation related algorithms. RepCoin-Withdraw: A reputation coin (RepCoin) is a tuple $(S, \pi)$, where S is the serial number and $\pi$ is the proof that S is a valid serial number. Here a user withdraws a wallet of tuples $(S, \pi)$. The number of such coins that can be withdrawn on any given day is bounded to restrict bad actors from colluding to inflate (or deflate) each others' reputations. The protocol begins with verification that each player's switch is "on".

Award is how one Group Member awards a reputation coin to another. Award is a two-party protocol whereby party B, as $P_B$, and A, as $P_A$, need the following: Party B needs the reputation coin of party A, while party A needs a certificate that party B received the reputation coin. As a non-limiting example, Award starts by having party A send party B a negative reputation coin, and party B send a certificate for that reputation coin. If party A likes the interaction with party B, party A can then send party B two positive reputation coins. If not, party B is left with a verifiable, negative reputation coin. Since party A can choose not to interact if party B doesn't send the certificate for the negative reputation coin, either party B gets a negative reputation coin or no interaction takes place.

AwardVerify: With this reputation related algorithm, party A ensures that party B, using party B's pseudonym, has obtained a permission to deposit by using T's oblivious database of pseudonyms and party B's certificate. If not, T can use the tag given to party A to erase all the names in party B's database and shut party B down.

RepCoinDeposit: This algorithm takes into account the "on-off" switch, so there is a sub-protocol here called Switch. The RepCoinDeposit protocol has party A send T the certificate of his switch and then a zero knowledge verification that the certificate is accurate. From then on, party A's switch is off since T can verify for any Group Member what party A's certificate is. After a given interaction, the Switch algorithm is continued by having party A generate a new certificate, a zero knowledge proof that it's a new certificate. A zero knowledge proof is a method for one party to prove to another that something is true, without revealing anything other than the statement is truthful. T signs the new certificate blindly, which is T's verification that this is party A's certificate. Additionally, T is able to add to its database a record of the pseudonym and the associated coin signature for verification by another Group Member later.

Identify: $(pk_U, \pi_G)/\bot \leftarrow$ Identify $(S, \pi_1, \pi_2)$. If a RepCoin is double-awarded with $(S, \pi_1)$ and $(S, \pi_2)$, the Group Oracle can locate the Group Member (party) who double-awarded the reputation coin using the identify operation. $\pi_G$ is a proof that $pk_U$ double-awarded the RepCoin with serial number S, as described in the Androulaki reference. In the present invention, this protocol begins with verification that both Group Members' switches are "on".

$\tau/\bot \leftarrow$ VerifyGuilt $(S, \pi_G, pk_U)$ outputs T if the Group Member U (represented by $pk_U$) double-awarded the reputation coin with the serial number S, as described in the Androulaki reference. In the present invention, this protocol begins with verification that each Group Members' switch is "on". $<C_U^l,\Sigma>/<\bot|\bot>$ RepCredRequest $(pk_B, pk_U, 1)$ $[U(sk_U), B(sk_B, D_{rd})]$. In this protocol, a Group Member U requests a record that will allow U to prove to another Group Member that he has a given reputation level 1. The Group Oracle B refers to $D_{rd}$, and if U has an adequate reputation, it issues a record $C_U^l$, as described in the Androulaki reference. In the present invention, this protocol is begins with verification that each Group Members' switch is "on".

$<\tau,\tau>/<\bot|\bot>\leftarrow$ ShowReputation $(P_{U_1}, P_{U_2}, pk_B, 1)[U_1, (sk_{U_1}, si_{P_{U_1}}, C_{U_1}^l), U_2(si_{P_{U_2}})]$. A Group Member $U_1$ (via $P_{U_1}$) proves to $U_2$ (via $P_{U_2}$) that he has a reputation l, as described in the Androulaki reference. In the present invention, this protocol begins with verification that each Group Members' switch is "on".

The following is a non-limiting example protocol of the present invention, which is illustrated in FIG. 1.

1. Party (group member) A runs RepCoinWithdraw and withdraws a wallet (set) of coins 100.
2. Party A, as $P_A$, begins the Award protocol with party B, as $P_B$ 102. In particular, party B is awarded a negative reputation coin and sends Party A a receipt for that coin 104. If Party B fails to send Party A a receipt for the negative reputation coin 106, the protocol terminates 108. Part of this receipt is the tag that party B generated to recognize him in T's oblivious database. Party B can generate multiple tags to hide his identity across interactions.
3. The desired interaction between Party A and Party B occurs 110.
4. Party A completes the Award protocol 112.
5. Party B as $P_B$ runs RepCoinDeposit (and within it, Switch) as $P_B$. Party B obtains a blind permission from T to increase (or decrease) his account 114 (if party B has two positive coins, he runs this twice). T obtains the pseudonym $P_B$ and the serial number of the coin. Then (or later) party B sends T the blind permission to increase or decrease party B's account. Note that until party B does so, his switch is "off" and he cannot conduct any additional business.
6. At any point, party A can run AwardVerify 116. If party A sees from T that $P_B$ has since logged in and not deposited party A's reputation coin, party A sends T the receipt of the reputation coin that party B sent party A. If party B has not deposited party A's reputation coin, then he hasn't received the blind permission yet. Further, party B may not have yet sent in the blind permission, but at this stage, it does not matter. T then runs the receipt from party A and the tag that party B sent party A and erases all of party B's information (obliviously) from its oblivious database. As applied to the present invention, "oblivious" means that party A does not know that it is party B's information he is erasing. An oblivious database is a database of values such that the values themselves and the entity to whom those values belong (e.g., party B) are unknown to the database holder (e.g., party A)
7. Alternatively, T may corrupt party B's information enough to render it unusable. In particular, party B's actual identity is not known now to T and so party B has no way of interacting with T unless it starts a completely new identity, which is always possible in an anonymous system.

Figure 2:
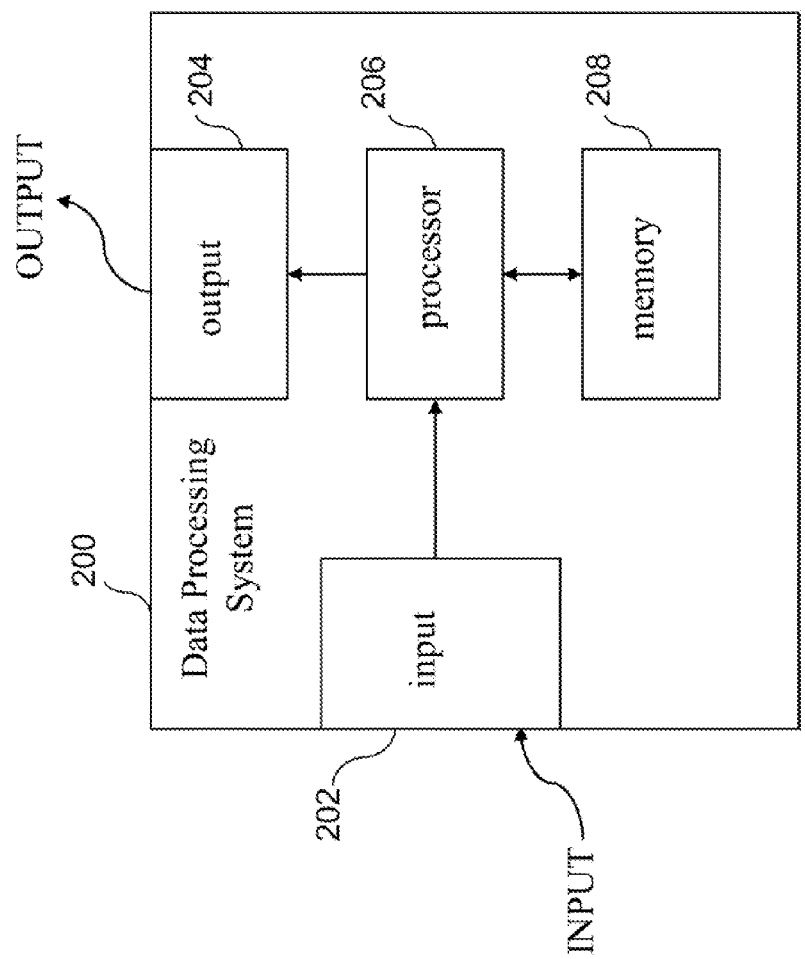
FIG. 2 is an illustration of a data processing system according to the present invention.

FIG. 2 illustrates a block diagram depicting components of a data processing system 200 (e.g., computer) incorporating the operations of the method described above and throughout the specification. The method utilizes a data processing system 200 for storing computer executable instructions (or instruction means) for causing a processor to carry out the operations of the above described method. The data processing system 200 comprises an input 202 for receiving information from a user. Information received may include input from devices such as cameras, scanners, keypads, keyboards, microphone, other peripherals such as storage devices, other programs, etc. The input 202 may include multiple "ports." An output 204 is connected with a processor 206 (or processors) for providing information for transmission to other data processing systems, to storage devices, to display devices such as monitors, to generating information necessary for delivery, and to other mechanisms for presentation in user-usable forms. The input 202 and the output 204 are both coupled with the processor 206, which may be a general-purpose computer processor or a specialized processor designed specifically for use with the present invention. The processor 206 is coupled with a memory 208 to permit storage of data and software to be manipulated by commands to the processor 206. The memory 208 includes instructions such that when the instructions are executed, the processor 208 (or processors) performs operations described above and throughout the specification.

Figure 3:
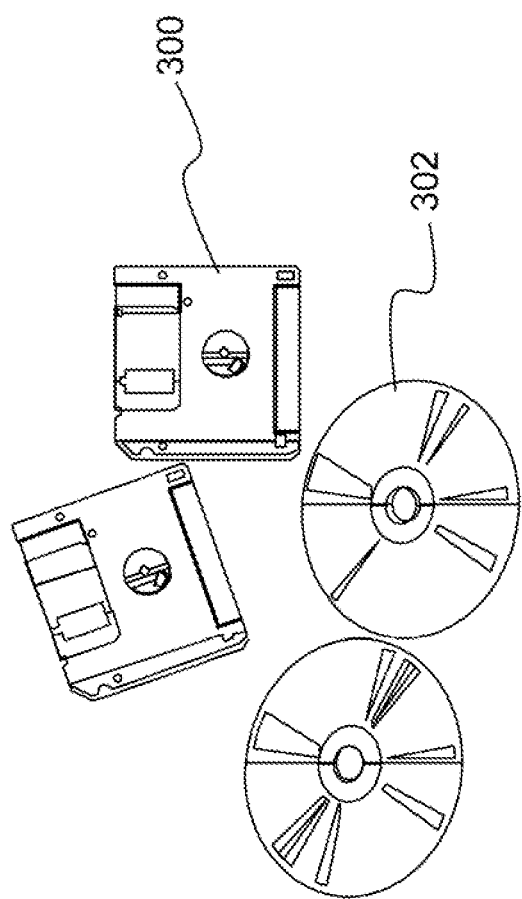
FIG. 3 is an illustration of a computer program product according to the present invention.

An illustrative diagram of a computer program product embodying the present invention is depicted in FIG. 3. As a non-limiting example, the computer program product is depicted as either a floppy disk 300 or an optical disk 302. However, as mentioned previously, the computer program product generally represents computer readable code (i.e., instruction means or instructions) stored on any non-transitory compatible computer readable medium.

What is claimed is:

1. A system for ensuring that promises are kept in an anonymous system, the system comprising:
   one or more processors and a memory having instructions such that when the instructions are executed, the one or more processors perform operations of:
      establishing a verifiable interaction between at least two users, each user having an identity, wherein each user utilizes at least one pseudonym to protect their identity, wherein the verifiable interaction is verifiable by a third party;
      storing the at least one pseudonym of each user in an anonymous database controlled by the third party;
      presenting at least one user in the verifiable interaction with a capability of performing an action that is agreed upon between the users;
      wherein if the user does not perform the action, then the user is prevented from establishing another verifiable interaction by the third party; and
      wherein the action comprises awarding at least one reputation point in a reputation system and in doing so the one or more processors perform operations of:
      allowing a first user to award the least one reputation point to a second user, wherein accumulation of reputation points determines a user's reputation in the reputation system; and
      presenting the second user with the capability of registering the at least one reputation point received by the second user from the first user;
      wherein if the second user does not register the at least one reputation point, then the second user is prevented from establishing another verifiable interaction by the third party.

2. The system as set forth in claim 1, wherein the identities of the at least two users are unknown to the third party.

3. The system as set forth in claim 1, wherein the one or more processors further perform an operation of allowing the second user to send the third party a blind permission to register the at least one reputation point, wherein the third party receives only a pseudonym of the second user and a reference number linked to the at least one reputation point.

4. The system as set forth in claim 1, wherein the one or more processors further perform operations of:
   providing, to the first user, data identifying all of the pseudonyms stored for the second user in the anonymous database; and
   allowing the first user to verify with the third party whether the second user has interacted with the third party since the verifiable interaction with the first user.

5. The system as set forth in claim 4, wherein the one or more processors further perform an operation of allowing the first user to request that the third party prevent the second party from establishing another verifiable interaction, if the first user verifies that the second user has interacted with the third party and has not registered the at least one reputation point.

6. A computer-implemented method for ensuring that promises are kept in an anonymous system, comprising an act of:
   causing a data processor to execute instructions stored on a non-transitory memory such that upon execution, the data processor performs operations of:
      establishing a verifiable interaction between at least two users, each user having an identity, wherein each user utilizes at least one pseudonym to protect their identity, wherein the verifiable interaction is verifiable by a third party;
      storing the at least one pseudonym of each user in an anonymous database controlled by the third party;
      presenting at least one user in the verifiable interaction with a capability of performing an action that is agreed upon between the users;
      wherein if the user does not perform the action, then the user is prevented from establishing another verifiable interaction by the third party; and
   wherein in the act of ensuring that at least one user in the verifiable interaction performs an action, the action comprises awarding at least one reputation point in a reputation system, wherein the method further comprises acts of causing a data processor to perform operations of:
      allowing a first user to award the least one reputation point to a second user, wherein accumulation of reputation points determines a user's reputation in the reputation system; and
      presenting the second user with the capability of registering the at least one reputation point received by the second user from the first user;
      wherein if the second user does not register the at least one reputation point, then the second user is prevented from establishing another verifiable interaction by the third party.

7. The method as set forth in claim 6, further comprising an act of causing a data processor to perform an operation of allowing the second user to send the third party a blind permission to register the at least one reputation point, wherein the third party receives only a pseudonym of the second user and a reference number linked to the at least one reputation point.

8. The method as set forth in claim 6, further comprising an act of causing a data processor to perform an operations of:
   providing, to the first user, data identifying all of the pseudonyms stored for the second user in the anonymous database; and
   allowing the first user to verify with the third party whether the second user has interacted with the third party since the verifiable interaction with the first user.

9. The method as set forth in claim 8, further comprising an act of causing a data processor to perform an operation of allowing the first user to request that the third party prevent the second party from establishing another verifiable interaction, if the first user verifies that the second user has interacted with the third party and has not registered the at least one reputation point.

10. A computer program product for ensuring that promises are kept in an anonymous system, the computer program product comprising computer-readable instructions stored on a non-transitory computer-readable medium that are executable by a computer having a processor for causing the processor to perform operations of:
   establishing a verifiable interaction between at least two users, each user having an identity, wherein each user utilizes at least one pseudonym to protect their identity, wherein the verifiable interaction is verifiable by a third party;

storing the at least one pseudonym of each user in an anonymous database controlled by the third party;

presenting at least one user in the verifiable interaction with a capability of performing an action that is agreed upon between the users;

wherein if the user does not perform the action, then the user is prevented from establishing another verifiable interaction by the third party; and wherein the action comprises awarding at least one reputation point in a reputation system, and wherein the computer program product further comprises instructions for causing a processor to perform operations of:

allowing a first user to award the least one reputation point to a second user, wherein accumulation of reputation points determines a user's reputation in the reputation system; and presenting the second user with the capability of registering the at least one reputation point received by the second user from the first user;

wherein if the second user does not register the at least one reputation point, then the second user is prevented from establishing another verifiable interaction by the third party.

11. The computer program product as set forth in claim 10, further comprising instructions for causing a processor to perform an operation of allowing the second user to send the third party a blind permission to register the at least one reputation point, wherein the third party receives only a pseudonym of the second user and a reference number linked to the at least one reputation point.

12. The computer program product as set forth in claim 10, further comprising instructions for causing a processor to perform operations of:

providing, to the first user, data identifying all of the pseudonyms stored for the second user in the anonymous database; and allowing the first user to verify with the third party whether the second user has interacted with the third party since the verifiable interaction with the first user.

13. The computer program product as set forth in claim 12, further comprising instructions for causing a processor to perform an operation of allowing the first user to request that the third party prevent the second party from establishing another verifiable interaction, if the first user verifies that the second user has interacted with the third party and has not registered the at least one reputation point.

14. The method as set forth in claim 6 wherein the identities of the at least two users are unknown to the third party.

15. The computer program product as set forth in claim 10 wherein the identities of the at least two users are unknown to the third party.

* * * * *